(12) United States Patent
Chao et al.

(10) Patent No.: US 6,529,614 B1
(45) Date of Patent: Mar. 4, 2003

(54) ADVANCED MINIATURE PROCESSING HARDWARE FOR ATR APPLICATIONS

(75) Inventors: Tien-Hsin Chao, Valencia, CA (US); Taher Daud, Tujunga, CA (US); Anikumar Thakoor, Covina, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/366,932

(22) Filed: Aug. 4, 1999

Related U.S. Application Data (60) Provisional application No. 60/095,472, filed on Aug. 5, 1998.

(51) Int. Cl.[7] .................................................. G06K 9/00
(52) U.S. Cl. ...................................................... 382/103
(58) Field of Search ................................. 382/103, 156, 382/159, 278; 342/179, 185, 197; 348/25, 113, 169

(56) References Cited

U.S. PATENT DOCUMENTS

| | | | |
|---|---|---|---|
| 4,762,397 A | 8/1988 | Pepper | 349/17 |
| 4,892,370 A | 1/1990 | Lee | 359/29 |
| 4,963,725 A | 10/1990 | Hong et al. | 250/201.9 |
| 5,080,464 A | 1/1992 | Toyoda | 359/559 |
| 5,129,040 A | 7/1992 | Hanazato et al. | 706/20 |
| 5,220,642 A | 6/1993 | Takahashi et al. | 706/40 |
| 5,255,362 A | 10/1993 | Brandstetter et al. | 706/40 |
| 5,317,651 A | * 5/1994 | Refregier et al. | 382/210 |
| 5,339,090 A | * 8/1994 | Crossland et al. | 345/90 |
| 5,428,711 A | 6/1995 | Akiyama et al. | 706/40 |
| 5,497,253 A | * 3/1996 | Stoll et al. | 359/29 |
| 5,515,189 A | 5/1996 | Kuratomi et al. | 349/17 |
| 5,534,704 A | * 7/1996 | Robinson et al. | 250/550 |
| 5,750,994 A | * 5/1998 | Schlager | 250/339.11 |
| 5,842,191 A | 11/1998 | Stearns | 706/40 |

OTHER PUBLICATIONS

Chao Et Al., Optical Implementation of a Feature–Based Neural Network with Application to Automatic Target Recognition, Applied Optics, Mar. 10, 1993, pp. 1359–1369, vol. 32, No. 8.

Chao Et Al., Optical Implementatin of a Matching Pursuit for Image Representation, Optical Engineering, Jul. 1994, pp. 2303–2309, vol. 33, No. 7

Chao Et Al., Real–Time Optical Holographic Tracking of Multiple Objects, Applied Optics, Jan. 15, 1989, pp. 226–231, vol. 28, No. 2.

Eberhardt Et Al., A Robotics Inverse Kinematics Problem Implemented on Neural Network Hardware with Gradient–Descent Learning, Expert Systems and Neural Networks, Aug. 1990, pp. 70–73, International Association of Science and Technology for Development, Honolulu, HI.

Eberhardt Et Al., Analog VLSI Neural Networks: Implementation Issues and Examples in Optimization and Supervised Learning, IEEE Transactions on Industrial Electronics, Dec. 1992, pp. 552–564, vol. 39, No. 6, IEEE.

(List continued on next page.)

*Primary Examiner*—Andrew W. Johns
*Assistant Examiner*—Shervin Nakhjavan
(74) *Attorney, Agent, or Firm*—Christie, Parker & Hale, LLP (57) ABSTRACT

A Hybrid Optoelectronic Neural Object Recognition System (HONORS), is disclosed, comprising two major building blocks: (1) an advanced grayscale optical correlator (OC) and (2) a massively parallel three-dimensional neural-processor. The optical correlator, with its inherent advantages in parallel processing and shift invariance, is used for target of interest (TOI) detection and segmentation. The three-dimensional neural-processor, with its robust neural learning capability, is used for target classification and identification. The hybrid optoelectronic neural object recognition system, with its powerful combination of optical processing and neural networks, enables real-time, large frame, automatic target recognition (ATR).

23 Claims, 10 Drawing Sheets

OTHER PUBLICATIONS

Eberhardt Et Al., Competitive Neural Architecture for Hardware Solution to the Assignment Problem, Neural Networks, Mar. 15, 1991, pp. 431–442, vol. 4.

Thakoor Et Al., Electronic Neural Network for Dynamic Rsource Allocation, AIAA Computing in Aerospace VIII, Oct. 1991, pp. 339–347, American Institute of Aeronautics and Astronautics, Inc., Baltimore, MD.

Chao Et Al., Optoelectronically implemented neural network with a wavelet preprocessor, SPIE, pp. 472–482, vol. 2026.

Chao Et Al., Portable Optical Wavelet Processor, SPIE, pp. 254–259, vol. 2752.

Chao Et Al., Real–time updatable optical wavelet processor, SPIE, pp. 118–124, vol. 2490.

Padgett Et Al., Detection and orientation classifier for the VIGILANTE image processing system, SPIE, pp. 191–201, vol. 3077.

Doung, T., et al.; "Low Power Analog Neurosynapse Chips for a 3–D Sugarcube Neuroprocessor", Proceedings of the IEEE International Conference on neural Networks; vol. III; Orlando; 1994; pp. 1907–1911.

Kumar, B.V.K. Vijaya; "Tutorial survey of composite filter designs for optical correlators"; Apppied Optics; vol. 31, No. 23; Aug. 10, 1992; pp. 4773–4801.

McCulloch, W.S., et al.; "A Logical Calculus of the Ideas Immenent in Nervous Activity"; Bulletin of Mathematical Biophysics; vol. 5; 1943; pp. 115–133.

Mahalanobis, Abhijit; "Correlation Filters for Object Tracking Target Re–acquisition and Samart Aimpoint Selection"; SPIE—The International Society for Optical Engineering; vol. 3073; 1997; pp. 25–32.

Mahalanobis, Abhijit; Kumar, B.V.K. Vijaya; Song, Sewoong; SIMS, S.R.F. and Epperson, J.F.; "Unconstrained correlation filters"; Applied Optics; vol. 33, No. 17; Jun. 10, 1994; pp. 3751–3759.

Padgett, Curtis; Cottrell, Garrison W. and Adolphs, Ralph; "Categorical Perception in Facial Emotion Classification"; Proceedings of the Eighteeth Annual Conference of the Cognitive Science Society; Lawrence Erlbaum Associates: San Diego, California; 1996; pp. 249–253.

Padgett, Curtis; Zhu, Michael and Suddarth, Steven; "Detection and orientaion classifier for the VIGILANTE image processing system"; SPIE—The International Society for Optical Engineering; vol. 3077; pp. 191–196.

Serati, Steven A.; Sharp, Gary, D.; Serati, Roylnn A.; McNihgt, Douglas J. and Stockley, Jay E. "128×128 analog liquid crystal spatial light modulator" SPIE—The International Society for Optical Engineering; vol. 2490.

Turk, Matthew and Pentland, Alex; "Eigenfaces for Recognition"; Massachusetts Institute of Technology; Journal of Cognitive Neuroscience; vol. 3, No. 1; 1991; 71–86.

* cited by examiner

ADVANCED MINIATURE PROCESSING HARDWARE FOR ATR APPLICATIONS

RELATE APPLICATIONS

This application is based on provisional patent application serial No. 60/095,472 filed Aug. 5, 1998.

GOVERNMENT LICENSE RIGHTS

The U.S. Government has certain rights in this invention pursuant to NAS7-1407 awarded by NASA.

BACKGROUND OF THE INVENTION

The invention is a hybrid optoelectronic neural object recognition system (HONORS) comprising two major building blocks: (1) an advanced grayscale optical correlator (OC) and (2) a massively parallel neural three-dimensional neural-processor (N3DP).

To date, one of the most successful system architectures developed for optical processing is the optical correlator. A high-speed updatable optical correlator usually employs two spatial light modulators (SLMs), one for the input image and one for a correlator filter. Optical correlators have been developed for various pattern recognition applications. Previously, limitations to the modulation capabilities of the spatial light modulator used for the correlator filter had restricted the filter encoding to binary phase-only filters (BPOFs) and phase-only filters (POFs). Both BPOFs and POFs construct edge-enhanced filters for high-pass matched spatial filtering. Although both BPOFs and POFs provide high discrimination, they lack distortion tolerance among the same class of input images under surveillance. Moreover, the BPOF and POF algorithms strictly limit the development of optimum composite filter algorithms for distortion invariant correlation for factoring background noise out of target of interest identification.

Lockheed Martin (LM) has developed a binary optical correlator for darpa transfer of optical processing to systems (TOPS) program. Also, Litton Data Systems has developed a miniaturized, rugged optical correlator (MROC) system for air force. Below is a chart indicating the input resolution, filter type and package size for each of these systems.

|  | LOCKHEED MARTIN (LM) | LITTON |
|---|---|---|
| INPUT | BINARY (256 × 256) | BINARY (256 × 256) |
| FILTER | BINARY (256 × 256, 3000 H | BINARY (256 256, 3000 Hz |
| PACKAGING | 10" × 10" × 4" | 5" × 4" 1.5" |
|  | RUGGED/TEM INVARIANT | RUGGED/MINIATURIZED |

Both LM and Litton correlators are binary systems, and thus, they are not suited for operation in a noisy, cluttered environment. A binary modulation scheme does not permit using a smart distortion invariant filter algorithm such as that of the present invention described below. Nor does a binary modulation scheme provide the grayscale optical capability needed for distortion invariant, or noise filtering, automated target recognition or operation in cluttered & noisy environments.

SUMMARY OF THE INVENTION

It is an object of the present invention to solve the deficiencies of current systems noted above.

It is another object of the present invention to provide a hybrid optoelectronic neural object recognition system comprising an advanced grayscale optical correlator and a massively parallel neural 3-D processor.

It is another object of the present invention to provide an optical correlator which enables a 1000 frames/second speed as opposed to two frames/second which is provided by a digital implementation.

It is another object of the present invention to provide a compact, high-speed grayscale optical correlator for Ballistic Missile Defense Organization (BMDO) real-time automatic target recognition (ATR) applications.

It is another object of the present invention to provide a robust optical correlation filter algorithm for distortion invariant automatic target recognition.

It is another object of the present invention to provide an advanced miniature grayscale optical correlator.

It is another object of the present invention to provide a maximum average correlation height (MACH) filter for use in the gray scale optical correlator which generates an output correlation plan that has a high-peak response with respect to all input images from the same class.

It is another object of the present invention to provide a maximum average correlation height filter that maximizes the height of the mean correlation peak relative to the expected distortion of a target of interest (TOI) (e.g. scale, rotation, perspective angle, etc.).

It is another object of the present invention to provide superior performance of the maximum average correlation height filter attributed to its unique capability of reducing the filters' sensitivity to distortions and the removal of hard constraints on the peak of the signal, which permits the optimization of performance criterion for the optical correlator.

It is another object of the present invention to provide an optical correlator that is uniquely suitable for an optical implementation using the grayscale maximum average correlation height filter.

It is another object of the present invention to provide a new complex-valued spatial light modulation architecture for advanced automatic target recognition applications.

These and other objectives are met by a hybrid optoelectronic neural object recognition system (HONORS), a robust pattern recognition system, for high-speed detection, segmentation, classification and identification of objects from noisy/cluttered backgrounds.

The hybrid optoelectronic neural object recognition system consists of an optical correlator (OC) and a neural three-dimensional neural-processor (N3DP). The optical correlator consists mainly of a unique gray-scale spatial light modulator (SLM) as the high resolution correlation filter and is used for object detection and segmentation. Due to the inherent parallel processing capability of optical correlator, it performs wide area surveillance (up to 1000×1000 pixels per frame) of targets of interest (TOI) in less than 1 millisecond per frame.

The detected and segmented target of interest is then handed over to the three-dimensional neural-processor. The three-dimensional neural-processor consists of a 64-channel high-speed electronic convolver coupled to a multilayer electronic neural network. Each input (with a variable window size up to 64×64) is simultaneously mapped to 64 eigenvector-based object data bank images. The output from each input image is a 64-element feature vector. The electronic neural network subsequently classifies the input feature vector into multiple classes of object.

Both the correlation filter and the eigenimage data bank rely on training from example images of known classes. Training relies on rules developed using an optimization process. More specifically, a maximum average correlation height (MACH) algorithm is used for correlation filter training. Eigenimage computation is used to establish the object data bank.

Unique advantages of the hybrid optoelectronic neural object recognition system include: high-speed (<1 ms per frame), large input frame (up to 1000×1000), high discrimination accuracy (over 90%), and ease of training. The hybrid optoelectronic neural object recognition system could be critical to both Defense and NASA applications ranging from weapon and sensor platform guidance, wide area surveillance, spacecraft rendezvous and docking, navigation and guidance, landmark tracking for precision landing, and landing hazard avoidance.

With the recent advancement in spatial light modulator technology, bipolar-amplitude modulation is realizable using a Ferroelectric liquid crystal (FLC) spatial light modulator developed by Boulder Nonlinear System (BNS). The system of the present invention takes advantage of spatial light modulator technology, and adds a new and novel bipolar-amplitude filter (BAF) technique for optical correlator applications.

The grayscale input spatial light modulator is used to replace the binary spatial light modulator used in previous state-of-the-art optical correlator systems. This has eliminated the need of a binarization preprocessing step. A Ferroelectric Liquid Crystal (FLC) spatial light modulator (made by Boulder Nonlinear Systems) that is capable of encoding real-valued data is also used for the correlation filter implementation. This grayscale optical correlator has enabled the direct implementation of a gray-scale-based correlator composite filter algorithm for distortion invariant target/object detection and segmentation as required by the hybrid optoelectronic neural object recognition system.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
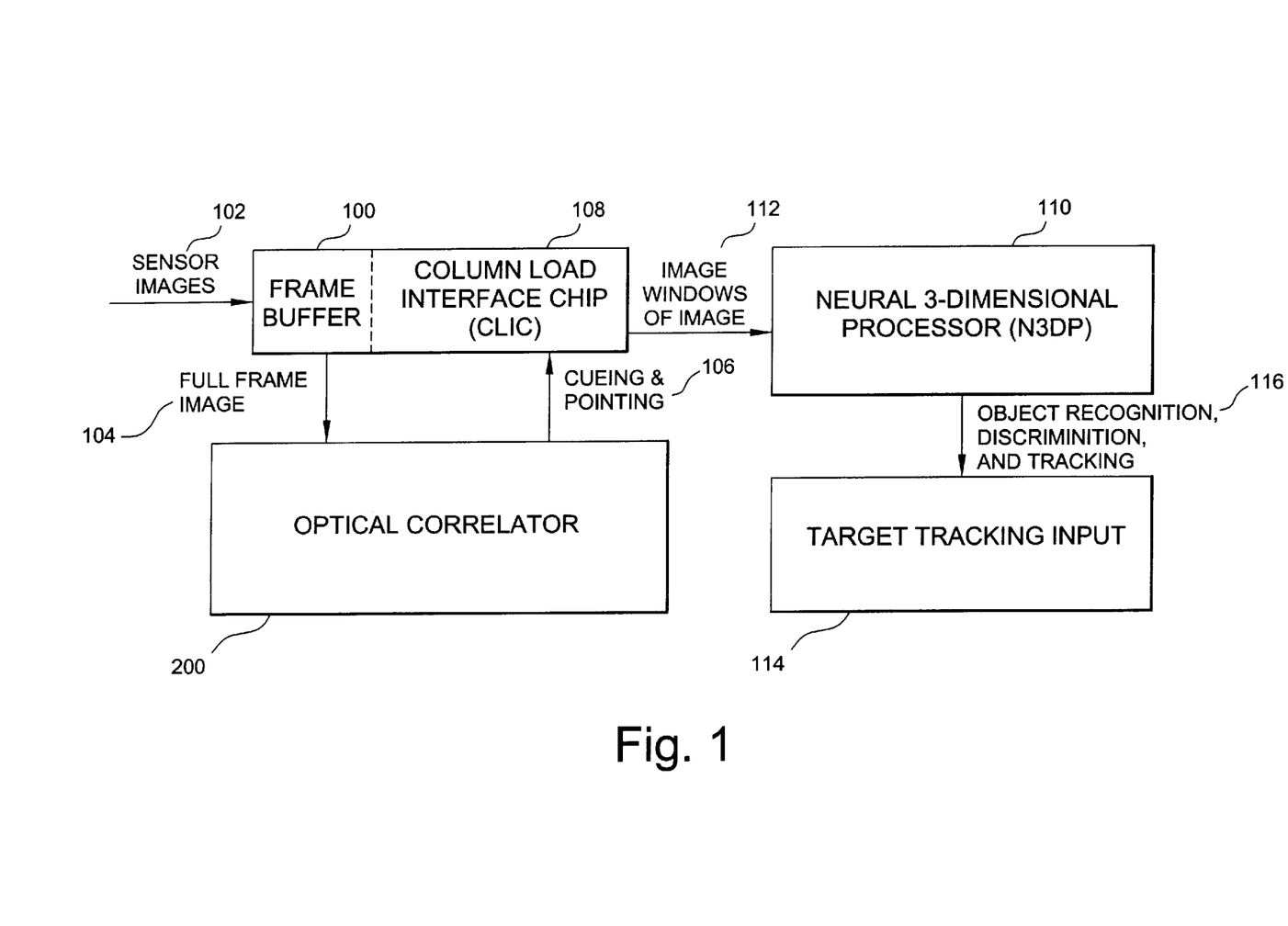
FIG. 1 illustrates a system block diagram of the image processing system of the present invention.

With reference to FIG. 1, a system block diagram of the hybrid optoelectronic neural object recognition system is shown. The entire automatic target recognition function is implemented in 5 consecutive steps. Sensor data/images, acquired by a multisensor platform in both one-dimensional (hyperspectral, acoustic) and two-dimensional (IR, visible, UV Focal Plane Arrays, LADAR, SAR) formats, are fed into the hybrid optoelectronic neural object recognition system through a frame buffer device 100, step 102. The frame buffer device 100, after format conversion, feeds the full frame input into a succeeding optical correlator (OC) 200 for preprocessing, step 104. The preprocessing function of optical correlator 200 is target of interest (TOI) detection and segmentation. Training target images are computed with a distortion invariant correlation filter algorithm and download into the optical correlator for optical correlation. The optical correlator 200 is capable of performing target detection and segmentation based on target shape, size, texture, and gray-scale distribution. It is also highly resistant to background noise and clutter. Due to its inherent parallel processing and shift invariance capabilities, the optical correlator 200 is used for wide-area survey. The output of the optical correlator preprocessor 200 is a list of targets (including both true and false targets) marked with their locations and types (e.g. tank, truck, missile, etc.). Based on these target of interest data output from the optical correlator 200, step 106, a column load interface chip (CLIC) 108 cuts-off the segmented target of interest images saved in the frame buffer 100 and passes them over to the following three-dimensional neural-processor 110, step 112. The three-dimensional neural-processor 110 comprises two main building blocks: an eigenvector-based feature extraction processor and a three-dimensional stacked analog neural network. The three-dimensional neural-processor 110, properly trained with a target database, performs fine target classification and identification. The output of three-dimensional neural-processor 110 is a viable input 114 for target tracking, navigation and guidance, sensor retasking, and mission replanning, step 116. A detailed description of the two building blocks of the hybrid optoelectronic neural object recognition system: optical correlator 200 and three-dimensional neural-processor 110 will be described in the following sections.

Figure 2:
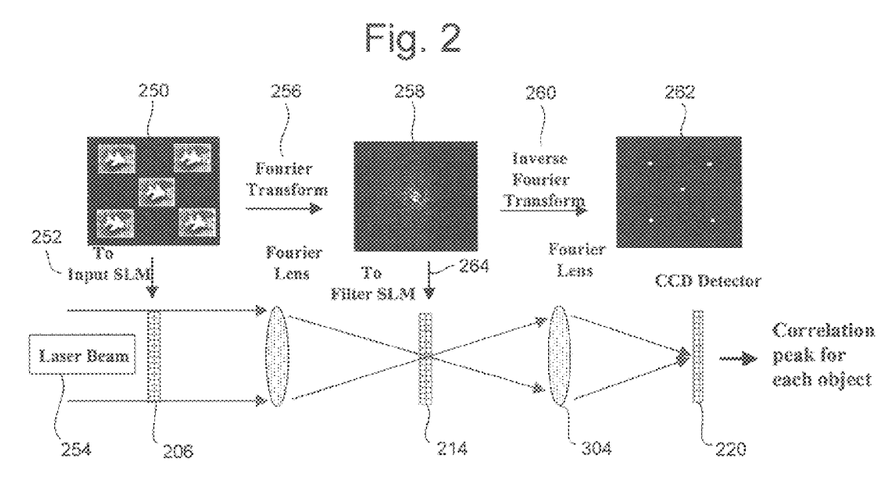
FIG. 2 illustrates the basic image path within the optical correlator of the present invention.

With reference to FIG. 2, the basic image path within optical processor 200 is shown. A plurality of targets of interest (TOIs) are captured in a composite image 250 and placed into an input spatial light modulator 206, step 252. A 25 mw diode laser 202 provides a light source for input into optical correlator 200, step 254. The image is directed onto a first Fourier transform lens 302 which performs a Fourier transform on input image 250, step 256 so that image 258 is produced. Image 258 is filtered through the filter spatial light modulator 214, step 264, and then directed through a second Fourier lens 304, so that image 258 is inverse Fourier transformed, step 260 into image 262, which is detected and digitized by charge coupled device detector 220 for detecting the correlation peak for each target of interest.

Figure 3:
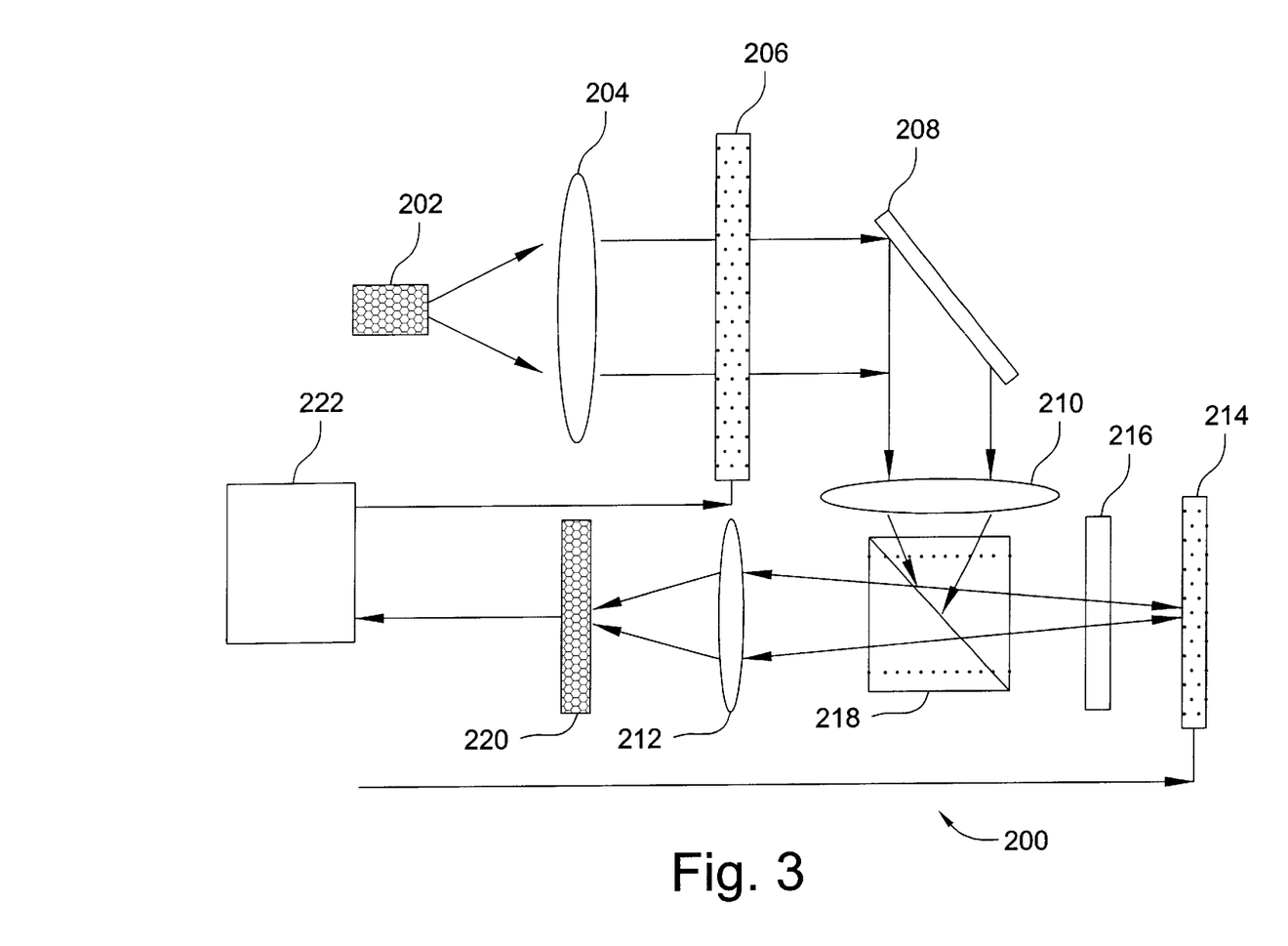
FIG. 3 illustrates an exemplary optical correlator architecture for the system of the present invention.

With reference to FIG. 3, a system architecture for the optical processor 200 of the system of the present invention is shown. A 25 mw diode laser 202, emitting at 690 NM, is collimated with a collimator lens 204 and used as the light source. A 640×480 pixel liquid crystal display (LCD) is used as an input spatial light modulator 206. A 128×128 pixel Ferroelectric liquid crystal spatial light modulator 214 is used as the filter spatial light modulator. The liquid crystal display spatial light modulator 206 operates in a transmission mode while the Ferroelectric liquid crystal spatial light modulator 214 operates at a reflection mode. The input image, after being directed by a mirror 208 and lens 210, is Fourier transformed by a Fourier transform lens 212 and then directed to address the filter spatial light modulator 214 via a polarizing cubic beam splitter, 216. A half-wave plate 218 is inserted between the beam splitter and the filter spatial light modulator 214 to steer the polarization orientation of the throughput light beam to ensure bipolar-amplitude output from the Ferroelectric liquid crystal spatial light modulator 214. The readout beam, reflected back from the filter spatial light modulator is inverse Fourier transformed by the Fourier transform lens 212 at the output correlation plane. A high-speed charge coupled device (CCD) 220 such as that made by Dalsa Inc. of Waterloo, Ontario, Canada, also called an output photodetector array, is used to capture the output for peak-detection. The output is then electronically transmitted to and from the three-dimensional neural-processor system 222 for processing as described below.

Due to the relatively small pixel size of both liquid crystal display spatial light modulator 206 and filter spatial light modulator 214, the focal length of the Fourier transform lens 212 is about 7 inches. By folding the optical correlator 200 four times using a microbench packaging device kit, such as that provided by Spindler & Hoyer, Inc. of Milford, Mass., the entire optical correlator 200 may be packaged into a volume of about 8"×4"×4". This is about the size of a camcorder. The optical correlator 200 has been assembled and has been successfully used for several field pattern recognition tests.

The input liquid crystal display spatial light modulator 206 possesses 640×480 pixels with a 24 mm pitch. This results in a 15.4 mm×11.2 mm aperture that is very suitable for compact packaging. The contrast ratio is about 100:1 with an 8-bit grayscale resolution when used for imaging display. The input spatial light modulator 206 is addressed in a video graphics array (VGA) graphic mode.

The key device leading to the real-valued filter modulation is the 128×128 analog Ferroelectric liquid crystal filter spatial light modulator 214. The filter spatial light modulator 214 is built using liquid crystal on silicon technology. This device utilizes high-tilt Ferroelectric liquid crystal material. Due to the use of the high-tilt Ferroelectric liquid crystal, all positive real amplitude, binary phase-only, and bipolar-amplitude modulations can be easily obtained by varying the orientation of the halfwave plate 216 placed in front of the filter spatial light modulator 214.

The Ferroelectric liquid crystal filter spatial light modulator 214 has a switching time between 50 ms to 100 ms that provides a frame rate up to 10 kHz. The contrast ratio is 76:1. An estimated 4–6 bit output grayscale resolution can be achieved by using a 8-bit gray-scale resolution for appropriate gray scale output.

The charge coupled device detector 220 is used to capture and digitize the correlation output for successive post-processing including peak detection and target segmentation in the neural three-dimensional neural-processor described below.

Figure 4:
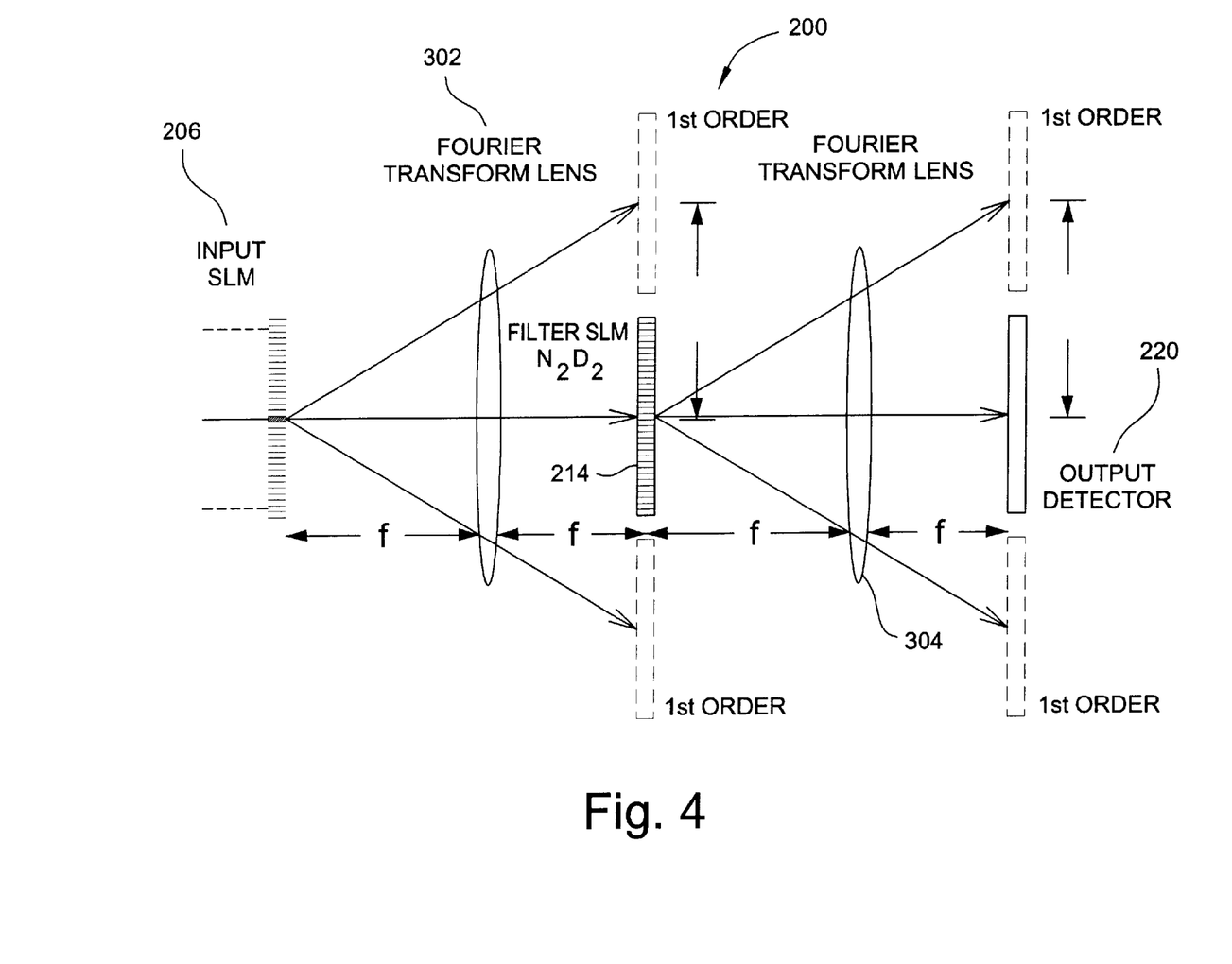
FIG. 4 illustrates an alternative format for the optical correlator of the present invention.

With reference to FIG. 4, an alternative format for the optical correlator 200 is shown. In the optical correlator 200 of FIG. 4, two Fourier transform lenses 302 and 304 are used. In order to achieve the goal of a high-speed and compact size, grayscale optical correlator 200 uses a pair of spatial light modulators 206 and 214, one for input 206 and the other for the filter spatial light modulator 214. The following steps are considered to determine required parameters.

The number of pixels in a spatial light modulator is called the space-bandwidth product (SBP). The space bandwidth product of input spatial light modulator 206 and that of filter spatial light modulator 214 should be well matched. The formula is as follows:

$$\lambda f \frac{1}{D_2} = N_1 D_1$$

Where $\lambda$ is the wavelength of the laser source, f is the focal length of Fourier transform lens 212, $D_1$ is the pixel pitch of input spatial light modulator 206. In order to avoid an aliasing problem, as shown in the equation above, $\lambda$ and f are chosen such that the first order diffraction of the input spatial light modulator 206, at the backfocal plane of the Fourier transform lens 214, is displaced by a distance equal to the aperture size, $N_2 D_2$, of the filter spatial light modulator 241. This can be expressed as $$\lambda f \frac{1}{D_1} = N_2 D_2$$

and $D_2$ is the pixel pitch of the filter spatial light modulator. Therefore $$N_1 = N_2$$

Thus, in order to optimize the spatial frequency matching between the input and the filter spatial light modulators 206 and 214, and to avoid aliasing in the output plane (i.e. non-overlapping of the correlation planes associated with zero and the first order of diffraction), the numbers of pixels (SBP) of input and filter spatial light modulators 206 and 214 are equal. Otherwise, a spatial light modulator that has fewer pixels than the other spatial light modulator would be a bottleneck of the correlator system. It is therefore preferable to pick a pair of matching spatial light modulators, 206 and 214, for optimum correlation performance.

The input spatial light modulator 206 is in the form known as grayscale, which means it only has to be of positive real-valued modulation. Currently available grayscale spatial light modulators include the Kopin LCD by the Kopin Corporation of Taunton, Mass. and the Boulder Nonlinear Systems (BNS) Ferroelectric grayscale spatial light modulator by Boulder Nonlinear Systems of Boulder, Colo. Since the speed of the input spatial light modulator 206 does not have to be relatively fast, the Kopin LCD with 60 frames/sec is adequate.

A primary novel feature of the new optical correlator 200 of the present invention is that a correlator with grayscale modulation capability in the Fourier transform plane is provided. This is a major advancement from previously built binary phase-only filters which have only +1 and −1 modulation capability. This limitation has been a major drawback that limits the performance of an optical correlator for real-world applications.

Figure 5:
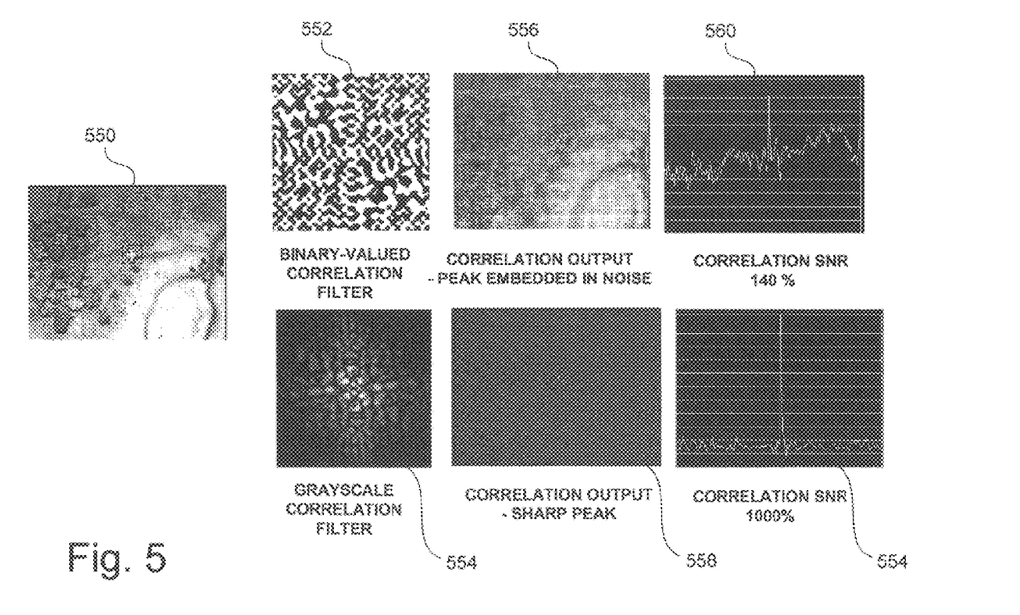
FIG. 5 is a pictorial representation illustrating the superiority of the use of the grayscale correlation filter of the present invention as opposed to a binary correlation filter.

With reference to FIG. 5, a pictorial representation illustrating the superiority of the use of a grayscale correlation filter as opposed to a binary correlation filter is shown. A target of interest image to be correlated is shown at 550. After the image 550 has been processed by a binary-valued correlation filter, an image 552 is produced. After the image 550 has been processed by a grayscale correlation filter, the image 554 is produced. The correlation output for the grayscale correlator is shown as an image 556, which illustrates that the peak output for the target of interest is embedded in significant background noise. Conversely, the correlation output for the grayscale correlator shows a sharp peak amid low brackground noise as illustrated in image 558. As shown in the corresponding signal to noise ratio (SNR) plots in images 560 and 562, the correlation SNR 560 for the binary correlator shows peak graph cluttered with numerous "false" peaks caused by noise which can cause false target identification, while the correlation SNR 562 for the grayscale correlator shows a very "clean" peak for the target of interest for less mistake prone target of interest correlation and identification.

In order to achieve the grayscale modulation capability of the invention, two types of spatial light modulators that can be used in the Fourier transform plane. One is a BNS ferroelectric liquid crystal spatial light modulator that can perform bipolar amplitude modulation. The other one is a spatial light modulator that exhibits a coupled phase-and-amplitude modulation. It has been reported that the Kopin and some ferroelectric liquid crystal spatial light modulators have exhibited amplitude-and-phase modulation capability. However, it has not heretofore been experimentally demonstrated that a sparsely distributed amplitude-and-phase modulation of an spatial light modulator used in an optical correlator has displayed high-discriminate optical correlation recognition, or identification of targets of interest in a noisy background.

Moreover, since the speed requirement of the spatial light modulator 214 is in orders of magnitude higher than that of the input spatial light modulator 206, the Kopin LCD is too slow for filter modulation. Therefore, the most appropriate candidate filter spatial light modulator 214 is the BNS ferroelectric LC spatial light modulator with its bipolar-amplitude modulation capability.

Due to the availability of different input and filter spatial light modulators, the specific system architecture design matches the performance of selected input and filter spatial light modulators. For example, the SBP and pixel pitch spatial light modulator dominates the selection of the focal length of the Fourier transform optics. The transmittance/reflectivity of the devices determines the light throughput efficiency and therefore the choice of laser source. Below is a table of candidate input SLMs and their respective features.

| Input SLM | Speed | SBP | Grayscale Resolution | Modulation | Pixel Pitch |
|---|---|---|---|---|---|
| Kopin | 60 Hz | 640 × 480 | <8 bit | Positive-real | 24 m |
|  |  | 320 × 240 | <8 bit | Positive-real | 15 m |

-continued

| Input SLM | Speed | SBP | Grayscale Resolution | Modulation | Pixel Pitch |
|---|---|---|---|---|---|
| BNS | 1000 Hz | 128 × 128 | 4–6 bit | Bipolar-amplitude | 40 m |
|  |  | 512 × 512 | <4 bit | Bipolar-amplitude | 15 m |

Figure 6:
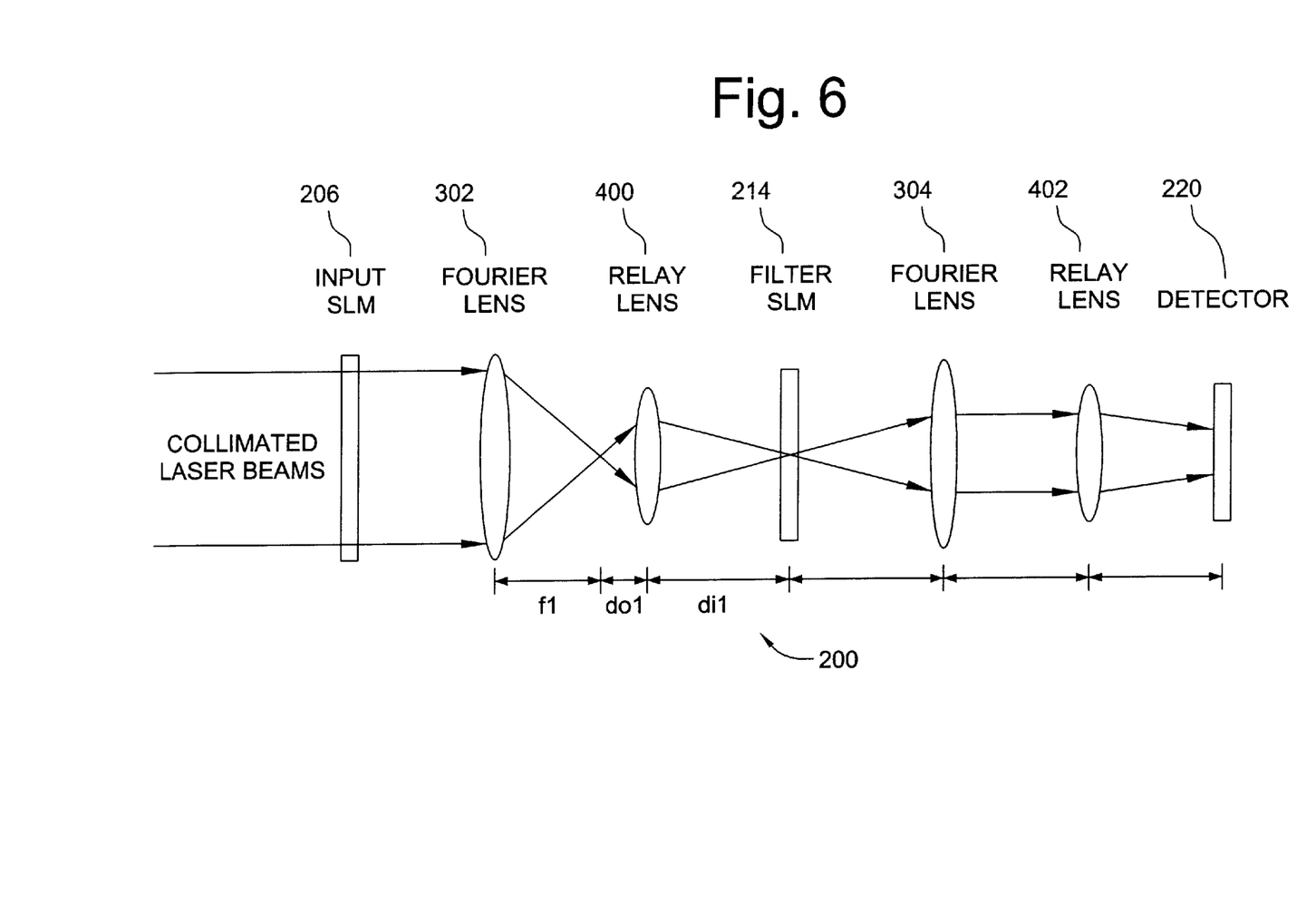
FIG. 6 illustrates a simplified representative diagram of the architecture of the optical correlator.

The system contains an innovative focal length tunable optical architecture that can easily accommodate the difference in spatial light modulator pitch size and SBP. With reference to FIG. 6 a simplified representative diagram of the architecture of optical correlator 200 is shown. Two relay lenses 400 and 402 are further included in the optical correlator 200 of FIG. 6. In order to minimize the length of the overall optical path and to provide flexible focal length adjustment capability, the system includes a novel two-stage optics technique. To achieve Fourier transform, a Fourier lens 302 followed by a relay lens 400 is used to obtain the effective focal length as required by matching the Fourier spectrum size of the input image to that of the filter spatial light modulator 214. The first Fourier transform lens 302 performs the Fourier transform with a Fourier spectrum smaller than what is needed. Relay lens 400, placed at a distance from the back focal plane of Fourier lens 302, will magnify the Fourier spectrum onto filter spatial light modulator 214. Since a very high-speed relay lens is used, the magnification factor can be continuously adjusted with a large range by varying the distance indicated by $d_{o1}$. Since distance $d_{o1}$ is very small, the distance $d_{o1}$ does not vary much when the magnification factor is adjusted. This relay optics technique has been proven very useful in obtaining continuous fine-tuning as well as minimizing the overall optical path length. A similar relay optics pair 304 and 402 is also used for the inverse Fourier transform to match the output correlation plane size to that of the photodetector.

The system of the present invention utilizes a new technique for optical implementation of correlation filters using the maximum correlation height filter algorithm. A maximum average correlation height filter h can be expressed as $$h = (\alpha C + \beta D + \gamma S)^{-1} M,$$

where $$M = \frac{1}{N} \sum_{i}^{N} X_i$$

is the average Fourier spectrum of all training images;

$$D = \frac{1}{N} \sum_{i}^{N} X_i^* X_i$$

is
the average power spectral density (PSD) all of training images $$S = \frac{1}{N} \sum_{i}^{N} (X_i - M)^*(X_i - M) = D - M^* M$$

is the average surface similarity of training images; and C is the covariance of input noise.

An experimental investigation has been performed for optical implementation of the maximum average correlation height filter into a real-time updateable spatial light modulator for use as an optical correlator filter. The spatial light modulator used was a 128×128 BNS ferroelectric liquid crystal spatial light modulator. Since the spatial light modulator only encodes bipolar amplitude data, a complex-to-real-value method is performed to prepare a real-valued maximum average correlation height file to obtain filter projection from a complex version to a real-valued version. Optimal projection can be found based on minimum Euclidean distance principle, i.e., minimizing.

$$E_\phi(h_p) = \Sigma |h_p - h \exp(i\phi)|^2 = \Sigma(h_r \sin\phi + h_i \cos\phi)^2$$

where $h_p = \text{Re}[h \exp(i\phi)]$ and the summation is over filter pixels. The optimal phase factor can be found as $$\varphi = \frac{\pi}{4} - \frac{1}{2} tg^{-1}\left(\frac{\propto -2h_r h_i}{h_r^2 - h_i^2}\right)$$

An experimental test was performed using optical maximum average correlation height filters. An IR tank image data base, provided by the Raytheon Missile Systems Company (RMSC) of Tucson, Arizona, was used for the test. A single maximum average correlation height filter was prepared using 5 training images. The filter was inserted into grayscale optical correlator 200 for correlation detection. The results are shown in FIG. 7.

Figure 7:
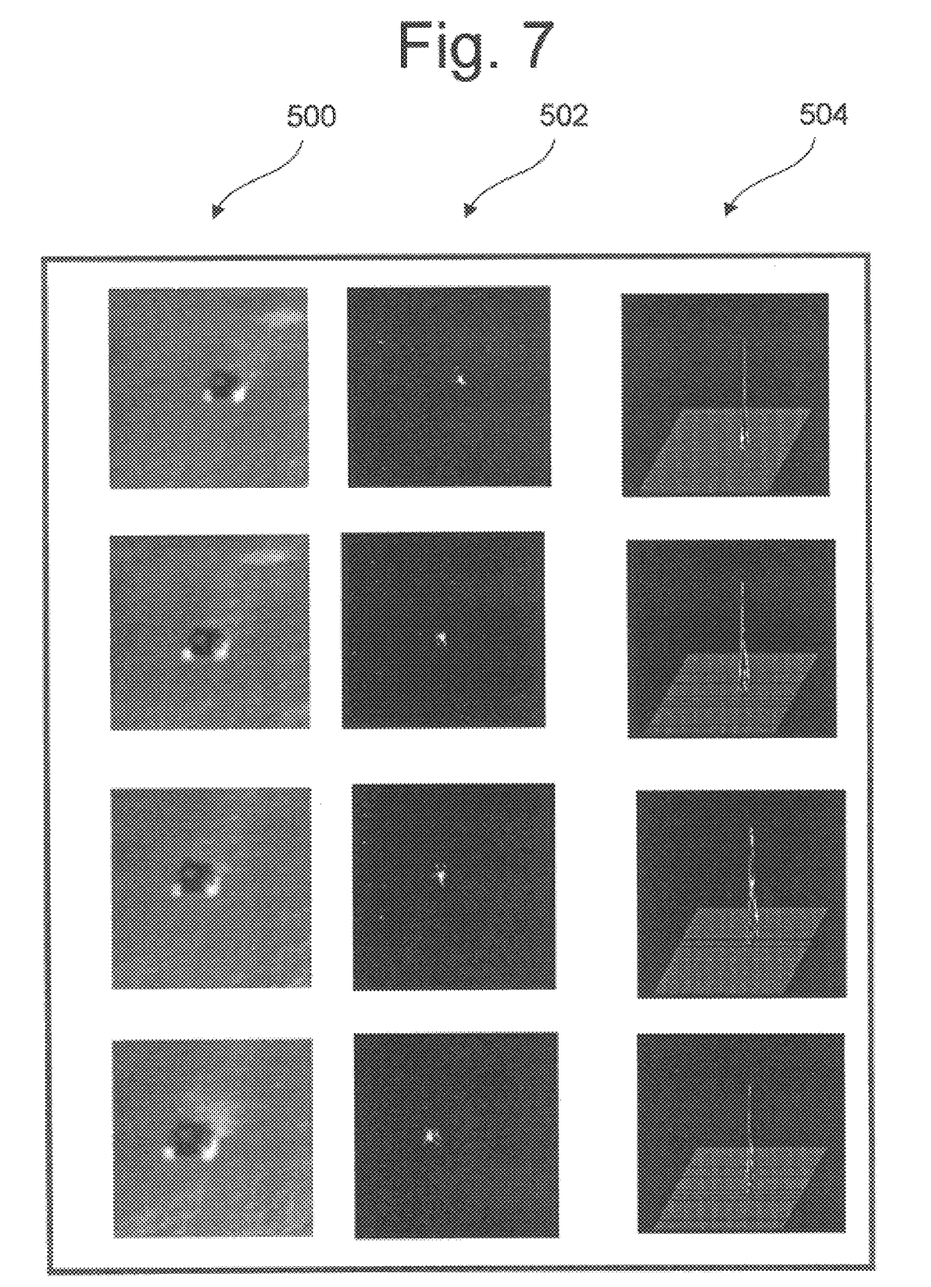
FIG. 7 illustrates target recognition experimental results using the optical correlator of the present invention.

With reference to FIG. 7 the target recognition experimental results using the optical maximum average correlation height filter are shown. Four tank images, with scale varying up to 100% was optically recognized using a single optical maximum average correlation height filter within the grayscale optical correlator 200 of the present invention. The correlation peaks associated with each of the tank inputs are very uniform. The inputs 500 and their corresponding correlation peak images 502 and a 3-D plot are shown 504.

There are several parameter modifications in some preferred embodiments of the present invention for digital-to-optical maximum average correlation height filter implementations. The digital maximum average correlation height filters may be converted from a complex-valued filter to a real-valued filter to match the spatial light modulator modulation capability. However, due to the 6-bit grayscale resolution limit in the BNS spatial light modulator 214 if several embodiments, the optical filter is bipolar-amplitude. The dynamic range of the digital filter has to be compressed to about 5 bit (one bit is reserved for encoding the polarity of the filter). An optimum compression method is used to convert the digital filter to an optical filter for higher discrimination.

The number of pixels contained in a target will determine the spatial frequency bandwidth in a correlation filter. A smaller target will spread out into a higher frequency band in its Fourier plane. It will also have less light throughput for the minimum number of targets. The light throughput efficiency and filter spatial light modulator 214 spatial frequency resolution will determine number of pixels of a target image determined by filter spatial light modulator 214. A larger target will focus most of its Fourier spectrum in the low-frequency band. Therefore the maximum number of pixels of a target image will be determined by the filter spatial light modulator spatial frequency resolution. Moreover, the dynamic range of filter spatial light modulator 214 will further confine the range of pixels contained in an input target.

During maximum average correlation height filter training, the number of images that can be used in a composite filter depends on the complexity, and the range of scale, rotation and perspective angle variations of the training images. In optical implementation, due to the much-limited dynamic range of filter spatial light modulator 214, the number of training images is less than that implemented in digital format.

Although the optical maximum average correlation height filter is bipolar-amplitude, the input file to filter spatial light modulator 214 has to be positive real. The polarity is obtained by using a properly oriented half-wave plate 216 placed in front of spatial light modulator 214. In order to assure that the resultant maximum average correlation height filter is a zero-mean filter, the bias level in the input filter file is appropriately computed. Otherwise, the correlator output plane will be plagued with very high-amplitude image clutter.

In order to test the capability of optical correlator 200 for real-time automatic target recognition, a field test was conducted to track a flight of a drone vehicle, specifically a JPL VIGILANTE TEST VEHICLE (VTV). The VTV is a remote controllable, turbo engine powered airborne target designed to test the recognition and tracking capability of an automatic target recognition system. Prior to the field test, training images were acquired from both a prerecorded VTV in-flight video and images recorded from a 3-D VTV model. A number of maximum average correlation height filters were prepared and performance tested at JPL's Advanced Optical Computing laboratory.

The optical correlator automatic target recognition field demonstration was held at the Mojave Airport, Calif. During the test, the VTV was first launched and then remote controlled to hover over the airport runway. A helicopter-borne sensor platform, equipped with a visible charge coupled device camera and an Infrared sensor, was used to acquire target images of the VTV. Since it was tested during daytime, only the charge coupled device video images were used for our automatic target recognition demonstration. The input video, remotely transmitted back from the sensor platform was fed into optical correlator 200 through a video cable. Several maximum average correlation height filters were sequentially downloaded into the correlator system to search for a match between the target and the filters with appropriate ranges if scale, rotation, and perspective.

Figure 8:
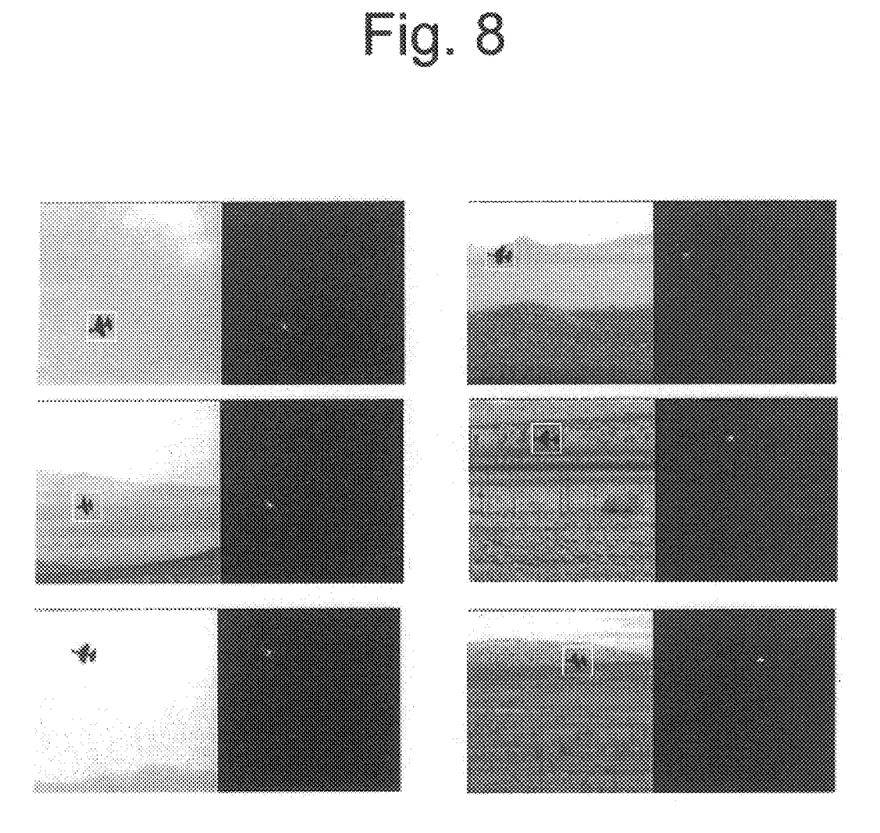
FIG. 8 illustrates some snapshots of input target images and correlation output data from the optical correlator of the present invention.

Processed at the video rate, frame-to-frame recognition and tracking of the VTV was successfully achieved during the field demonstration test. Some snapshots of the input target images and correlation output data are shown in FIG. 8. In FIG. 8, the VTV sample images were recorded against both clear (sky view) and cluttered (field view). Sharp correlation peaks were obtained in both cases. This further demonstrated the target discrimination and clutter rejection capability of optical correlator 200.

Figure 9:
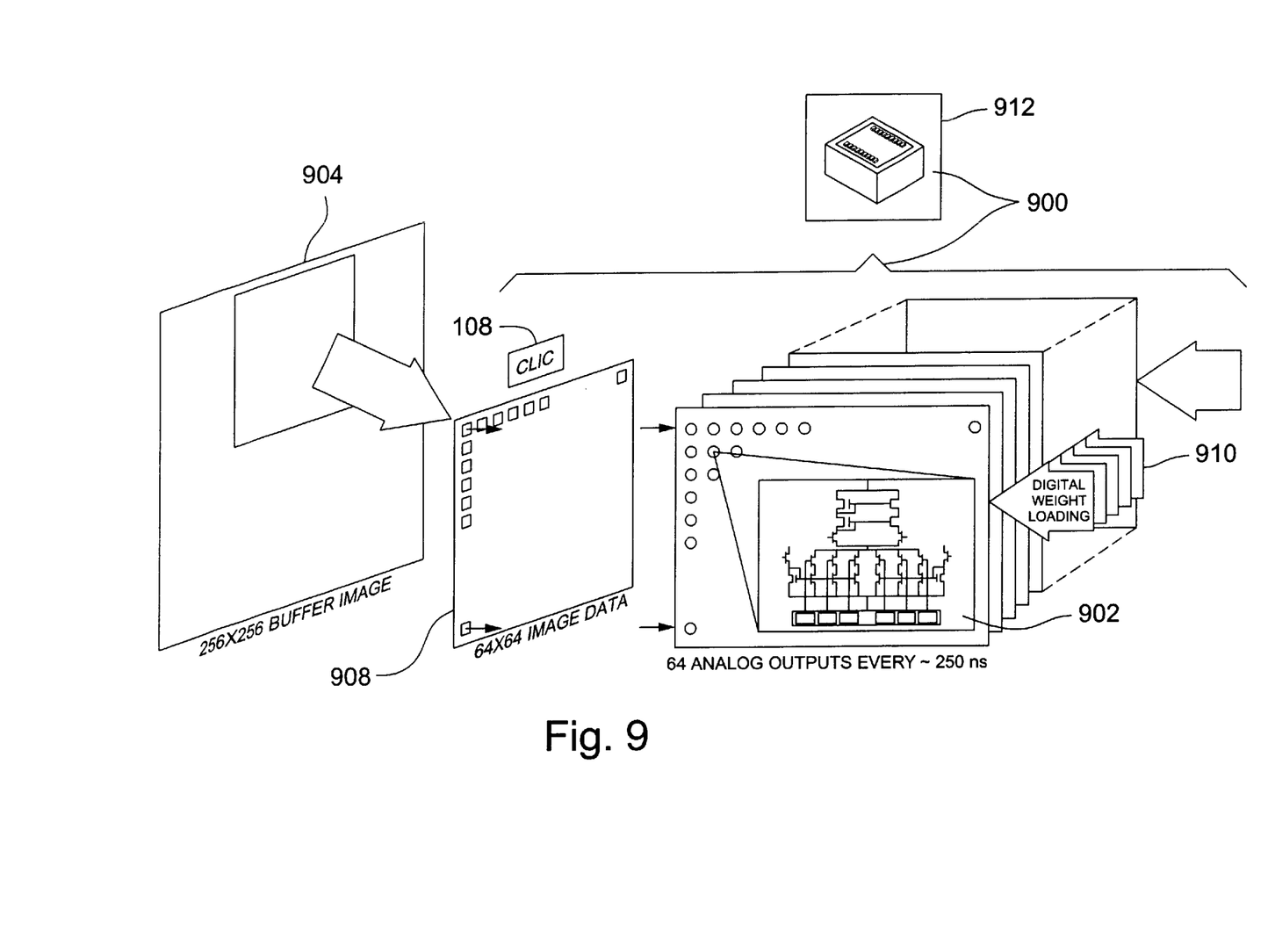
FIG. 9 illustrates an exemplary neural three-dimensional neural-processor.

With reference to FIG. 9, an exemplary neural three-dimensional neural-processor (N3DP) 900 is shown three-dimensional neural-processor 900 is a ground and airborne image-processing/target-recognition computer using technology developed under JPL's 3DANN-M program. The key device of the three-dimensional neural-processor is a three-dimensional artificial neural network, in version M at JPL, (3DANN-M) 902, a sugar-cube-sized, low-power neural-processor with three-dimensional image convolution (IC) and fast framing capability. The 3DANN-M 902 is designed to accommodate arbitrarily sized sensor input 904 that has been preprocessed by the optical correlator's 200 detection and segmentation algorithms described above.

The 3DANN-M 902 comprises of 64 layers of a 64×64 synapse array based on 8-bit multiplying digital to analog technology and incorporating a special-purpose image-write device called a column loading input chip (CLIC) 108 that is bump-bonded to a synapse array stack 908. The three-dimensional neural-processor 900 can be realized in a 10-gm, 3-cm$^3$ package, with power consumption of 2.5 W. The CLIC 906 is specially designed for the rastering of a 64×64 window 908 of a larger image in the frame buffer and is synchronized with the 3DANN-M's 250-ns inner-product operations.

The 3DANN-M 902 comprises a high-speed synapse circuit. The design is based on a multiplying digital to analog (MDAC) circuit, with 8-bit weight storage. The synapse has a voltage-input/current-output configuration. The 3DANN-M incorporates a design that is superior to traditional designs that would normally require doubling of the transistor count for each additional bit of resolution. Such contemporary designs would normally necessitate a much larger (and slower) chip, as well as an increase from a 7-bit to an 8-bit synapse cell for a 64×64 synapse array. In the 3DANN-M 902, 64 neural computations with a 4096 (i.e., 64×64) input array 908 can be accomplished in 250 nanoseconds (i.e., $10^{12}$ multiply and add operations in 1 second, or 1000 frames per second). The circuitry of the 3DANN-M 902 is designed to operate at around 90 K temperature and low power consumption of approximately only 2.5 watts. Using the CLIC 108, a 64×64 block of image data 908 can be rastered and fed through for processing in the 64 layers of synapse circuit arrays generally indicated at 910. The CLIC 108 comprises a 64×64 array 908 of 8-bit static random access memory (SRAM) arrays and 8-bit shift registers (8-SHR) used to store the input signals as 8-bit digitally stored weights and to shift the stored signals, column by column or row by row, to the right, down, or up as required, with the shift signals SR, SD, or SU, respectively. The stored weights are then converted by digital to analog converters (DACs) to 4096 analog voltage signals, to be fed into the 3DANN-M stack 910 every 250 nanoseconds. Incorporating a synapse circuit that is modeled after a biological neural network, makes the sugar-cube-sized end product, the 3DANN-M 902, an extremely powerful image-processing engine capable of carrying out in parallel 64 convolutions of the form $$C(x, y) = \sum_{i=1}^{64} [f(x, y) \cdot g_i(x, y)]$$

where f(x,y) is the input image, $g_i(x,y)$ is the i-th filter, • is the convolution operation, and C(x,y) is the output image.

Due to the use of the optical correlator detection/segmentation preprocessor 200 described above, the end-to-end raster-scan for full-frame of convolution operation provided by the CLIC 108 is not needed. Instead, the CLIC 108 is used for sequentially downloading segmented targets of interest. This not only saves orders of magnitude in operation time for the large input frame 904, but also keeps the system frame rate independent of the increase in input image size.

The 3DANN-M network produces 64 inner-products (two 4096-element vectors) every 250 ns, so the frame buffer 904 is used to hold an image and feed a new column or row of a 64×64 subwindow to the CLIC 108 every 250 ns (thus accomplishing 64 convolutions of a 256×256 image with 64×64 masks in 16 ms). The 64 analog values generated by the 3DANN-M 902 every 250 ns are converted to 8-bit digital values and passed along to an associated feedback memory and point operation processor (POP). This design provides flexibility in programming different point processing operations. A custom VLSI implementation of a POP may be employed to perform desired target recognition/tracking functions on the output of the 3DANN-M 902. Command and control of the hybrid optoelectronic neural object recognition system operations (e.g., detection/classification/tracking mode command, loading of templates, point operation functions, data recording, etc.) may be done through a P6 motherboard.

Figure 10:
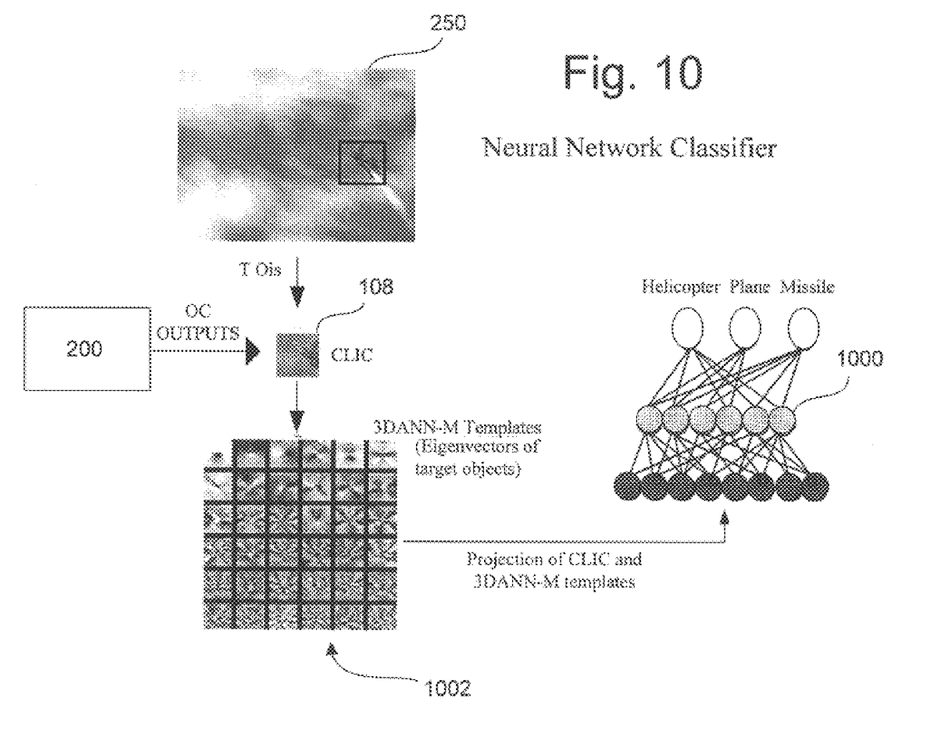
FIG. 10 illustrates a hierarchical neural network based on eigenvectors employed to achieve target recognition of objects of arbitrary size and orientation efficiently for the present invention.

With reference to FIG. 10, a hierarchical neural network 1000 based on eigenvectors employed to achieve target recognition of objects of arbitrary size and orientation efficiently is shown. Using the 3DANN-M 902 (FIG. 9) as the dedicated synapse weight multiplier hardware, 64 eigenvector templates 1002 representing the principle axes of a collection of multidimensional data points (i.e., object images of various configurations) are employed for target of interest clasification. Since each data point (image) is a 4096-element vector, finding a set of 4096 orthonormal eigenvectors is possible (64 of which can reside on the 3DANN-M 902). Selecting the top 64 eignevectors constructed from principle component analysis of target imagery provides a means to reduce the dimensionality of an image, yet still retain much of the information relevant for classification.

The problem that has plagued pattern recognition systems is that, unless some restrictions are placed on variations in the target imagery, the top components become quite general and perhaps unsuitable for fine distinction of a target with all possible scale, rotation, and perspective variations. The system of the present invention parameterizes (e.g., lighting, pose, class, identity, and scale) and partitions the object in target of interest image 250 space in a hierarchical fashion. The top layer is the detection layer, in which the maximum average correlation height correlation filter 200 described above trained for representing each partition, is first used to detect and segment all possible targets (with some false alarms). target of interest image 250 is then fed into three-dimensional neural-processor 900 for classification. To classify each partition, a neural network 1000 is trained on data imagery drawn from the set of variables that define the partition and projected onto eigenvectors suitable for that particular distribution of data.

In sum, information about the object in target of interest image 250 (its class, identity, or pose) is processed in a coarse-to-fine manner. For instance, after detecting an object in a frame, a rough estimate of image pose/scale is made, a result that can then be used to limit the variation that needs to be considered during object classification.

One application of the present invention is for use in JPL's Digital Sky Project, which focuses on astronomical catalogs produced by the all sky surveys and upon the relationships between those catalogs. When complete, there will be a rich relational search capability to search single catalogs and across catalog sets, including for the first time, proposed object associations between catalogs. This search capability will be online—each of the catalogs and their indexes will be hosted individually using online disk storage.

The Digital Sky Project will eventually produce a catalog of half a billion objects derived from 3 terabytes of pixel data in three different bandpasses. This survey requires the automated reduction of 2,682 photographic plates, withy each plate containing approximately half a million sources. The basic reduction of each of these 23 K by 23 K pixel plates involves three distinct, computationally intensive steps: 1) the detection of objects, 2) the segmentation of each object to extract image features, and 3) the classification of each object based on the extracted image features. As described above, the hybrid optoelectronic neural object recognition system hardware architecture, is particularly suitable for Digital Sky Project data processing.

The unique advantages of using the hybrid optoelectronic neural object recognition system for the Digital Sky database processing include: high-speed (<1 ms per frame), large input frame (up to 1000×1000), automatic target detection and segmentation, high discrimination accuracy and ease of training.

The novel system described herein comprises a powerful automatic target recognition system which combines an advanced optical correlator and a 3-D integrated neural network based processor in a compact package to perform object recognition with unprecedented speed. The algorithms described, identified and simulated for the optimum operation of both the optical correlator and three-dimensional neural-processor demonstrate real-time detection, classification, and precision-tracking of ground-based and airborne targets.

It will thus be seen that the objects set forth above, among those made apparent from the preceding description, are provided and, since changes may be made in carrying out the above System and method and in the construction set forth without departing from the spirit and scope of the invention, it is intended that any and all matter contained in the above description and shown in the accompanying drawings shall be interpreted as illustrative and not in a limiting sense.

What is claimed is:

1. A hybrid optoelectronic neural object recognition system for automated fast target recognition of a target of interest, comprising:
   a grayscale optical correlator for optically detecting and segmenting a target of interest thereby producing a target of interest image, the grayscale optical correlator comprising a gray-scale spatial light modulator for use as a correlation filter;
   a neural-network trained with object templates for convolving with the target of interest image; and
   a neural three dimensional processor comprising an image-processing and target recognizing computer for identifying the target of interest by convolving the target of interest image with the neural network.

2. The system of claim 1, wherein the neural three-dimensional processor comprises an application-specific integrated circuit.

3. The system of claim 2, wherein the spatial light modulator is a high resolution correlation filter.

4. The system of claim 1, herein the neural network is a mutilayer electronic neural network.

5. The system of claim 4, wherein the neural network comprises a databank of eigenvector based images.

6. The system of claim 5, wherein the neural three dimensional processor is further for converting the target of interest image into an eigenvector based target of interest image.

7. The system of claim 6, wherein the eigenvector based images comprise 64 element feature vectors.

8. The system of claim 7, wherein the neural three dimensional processor is further for converting the target of interest image into an eigenvector based 64 element feature vector.

9. The system of claim 8, wherein the neural network comprises a databank created using an eigenimage computation.

10. The system of clam 1, wherein the system is for automated fast target recognition of a plurality of targets of interest.

11. The system of claim 10, wherein the grayscale optical correlator is for optically detecting and segmenting the plurality of targets of interest, thereby producing a plurality of target of interest images.

12. The system of claim 11, further comprising a frame buffer for storing the plurality of target of interest images.

13. The system of claim 12, further comprising a column load interface processor chip for retrieving each of the target of interest images from the frame buffer and electrically passing each target of interest image to the neural three-dimensional processor.

14. The system of claim 13, wherein the ground and airborne image-processing and target recognizing computer is for identifying each target of interest by convolving each target of interest image with the neural network.

15. The system of claim 1, wherein the optical correlator further comprises an input spatial light modulator.

16. The system of claim 15, wherein the optical correlator further comprises a collimator lens for focusing the target of interest image onto the input spatial light modulator.

17. The system of claim 16, wherein the input spatial light modulator comprises a 640×480 pixel liquid crystal display.

18. The system of claim 17, wherein the optical correlator further comprises a ferroelectric liquid crystal spatial light modulator for filtering the target of interest image.

19. The system of claim 18, wherein the optical correlator further comprises a fourier transform lens for fourier transforming the target of interest image.

20. The system of claim 19, wherein the optical correlator further comprises a polarizing cubic beam splitter for focusing the target of interest image from the fourier transform lens onto the ferroelectric liquid crystal spatial light modulator.

21. The system of claim 20, wherein the optical correlator further comprises a half-wave plate inserted between the polarizing cubic beam splitter and the ferroelectric liquid crystal spatial light modulator to steer the polarization orientation of the target of interest image to ensure bipolar amplitude output from the ferroelectric liquid crystal spatial light modulator.

22. The system of claim 21, wherein the optical correlator further comprises an output photodetector array for capturing and digitizing the target of interest image from the optical correlator.

23. A method for automatic target recognition, comprising the steps of:
   computing a plurality of training images;
   downloading the plurality of training images into an optical correlator;
   capturing an image with a plurality of targets of interest;
   directing the captured image into the optical correlator;
   detecting the plurality of targets of interest in the captured image by segmenting the captured image using a gray scale spatial light modulator as a correlation filter;
   producing a plurality of target of interest images from the segmentations of the captured image;
   digitizing each target of interest image from the optical correlator;
   transforming each digitized target of interest image into an eignvector data element for each target; and
   classifying and identifying each target of interest by processing each corresponding eignvector data element using a neural network trained with an eigenvector-based target database.

* * * * *